(12) United States Patent
Nammi

(10) Patent No.: US 9,532,260 B2
(45) Date of Patent: Dec. 27, 2016

(54) INITIATING NETWORK ASSISTANCE IN A WIRELESS NETWORK

(71) Applicant: TELEFONAKTIEBOLAGET L M ERICSSON (PUBL), Stockholm (SE)

(72) Inventor: Sairamesh Nammi, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 219 days.

(21) Appl. No.: 14/128,586

(22) PCT Filed: Jun. 17, 2013

(86) PCT No.: PCT/SE2013/050704
§ 371 (c)(1),
(2) Date: Dec. 20, 2013

(87) PCT Pub. No.: WO2014/129947
PCT Pub. Date: Aug. 28, 2014

(65) Prior Publication Data
US 2014/0313990 A1    Oct. 23, 2014

Related U.S. Application Data

(60) Provisional application No. 61/769,041, filed on Feb. 25, 2013.

(51) Int. Cl.
*H04W 28/02* (2009.01)
*H04W 36/20* (2009.01)
(Continued)

(52) U.S. Cl.
CPC ........ *H04W 28/0236* (2013.01); *H04J 11/003* (2013.01); *H04J 11/0053* (2013.01);
(Continued)

(58) Field of Classification Search
CPC .. H04W 72/082; H04W 84/045; H04W 48/18; H04W 28/0236; H04W 48/12; H04W 72/042; H04J 11/003; H04J 11/0053; H04L 1/00; H04L 27/2601
See application file for complete search history.

(56) References Cited

U.S. PATENT DOCUMENTS 8,295,331 B2 * 10/2012 Nammi .............. H04B 1/71072
375/148
8,634,794 B2 * 1/2014 Nammi .............. H04B 1/71072
455/228

(Continued)

FOREIGN PATENT DOCUMENTS

EP         2246989 A2    11/2010
WO      2012108349 A1     8/2012

OTHER PUBLICATIONS

Hisilicon Huawei, "Proposed SID: Study on UMTS Heterogeneous Networks" TSG RAN Meeting #57, RP-121436, 2012, 10 pages.
(Continued)

*Primary Examiner* — Curtis A Alia
(74) *Attorney, Agent, or Firm* — Rothwell, Figg, Ernst & Manbeck, P.C.

(57) ABSTRACT

In MIMO scenarios, a mobile terminal (1400) can be exposed to signals intended for wireless terminals (640) other than the mobile terminal (1400). If the mobile terminal (1400) is capable of performing interference cancellation, then a network node (1000), such as a base station (610, 620) or RNC (630), can provide the mobile terminal (1400) with interference information so that the mobile terminal (1400) can efficiently cancel interferences due to these interfering signals. The network node (1000) may provide the mobile terminal (1400) with interference information if it determines that mobile terminal (1400) will benefit from the information. The mobile terminal (1400) may cancel the interfering signals from the received signal based on the interference information.

22 Claims, 9 Drawing Sheets

(51) Int. Cl.
*H04J 11/00* (2006.01)
*H04L 27/26* (2006.01)
*H04L 1/00* (2006.01)
*H04W 48/12* (2009.01)
*H04W 72/04* (2009.01)
*H04W 72/08* (2009.01)
*H04W 84/04* (2009.01)

(52) U.S. Cl.
CPC ............ *H04L 1/00* (2013.01); *H04L 27/2601* (2013.01); *H04W 48/12* (2013.01); *H04W 72/042* (2013.01); *H04W 72/082* (2013.01); *H04W 84/045* (2013.01)

(56) References Cited

U.S. PATENT DOCUMENTS

| | | | | |
|---|---|---|---|---|
| 8,837,269 | B2* | 9/2014 | Ancora | H04J 11/0056 370/203 |
| 2010/0105402 | A1* | 4/2010 | Chun | H04L 1/0027 455/450 |
| 2010/0273502 | A1* | 10/2010 | Uemura | H04W 52/0206 455/452.2 |
| 2011/0201277 | A1* | 8/2011 | Eguchi | H04W 72/082 455/63.3 |
| 2013/0077578 | A1* | 3/2013 | Wang | H04B 1/712 370/329 |
| 2013/0114447 | A1* | 5/2013 | Luo | H04B 1/7103 370/252 |
| 2013/0260807 | A1* | 10/2013 | Suresh | H04W 24/02 455/501 |
| 2013/0279547 | A1* | 10/2013 | Jonsson | H04B 1/7107 375/148 |
| 2015/0208425 | A1* | 7/2015 | Caretti | H04W 72/082 370/336 |

OTHER PUBLICATIONS

Ericsson et al. "Initial considerations on Heterogeneous Networks for UMTS" 3GPP TSG RAN WG1 Meeting #70bis, R1-124512, 2012, 10 pages.

Ericsson et al. "Heterogeneous Network Deployment Scenarios" 3GPP TSG-RAN WG1 #70bis R1-124513, 2012, 3 pages.

Ericsson et al. "Network Assistance for Interference Cancellation in Cell Range Expansion for Heterogeneous Networks" 3GPP TSG RAN WG1 Meeting #72bis, R1-131547, 2013, 8 pages.

Ericsson et al. "Performance Impact due to Additional Overhead Channel for Network Assistance" 3GPP TSG RAN WG1 Meeting #74, R1-133639, 2013, 6 pages.

Ericsson et al. "Text Proposal on Range Expansion with Network with Network Assisted Interference Cancellation" 3GPP TSG RAN WG1 Meeting #74, R1-133652, 2013, 2 pages.

International Preliminary Examining Authority in the Written Opinion dated Feb. 4, 2015, in connection with International Application No. PCT/SE20130050704, 10 pages.

International Preliminary Examining Authority in the Written Opinion dated May 7, 2015, in connection with International Application No. PCT/SE20130050704, 10 pages.

Ericsson et al. "Downlink Interference Analysis in Heterogeneous Networks" 3GPP TSG-RAN WG1 Meeting #72, R1-130612, 2013, 13 pages.

Ericsson et al. "Cell Range Expansion in Heterogeneous Networks" 3GPP TSG RAN WG1 Meeting #72, R1-130622, 2013, 6 pages.

* cited by examiner

INITIATING NETWORK ASSISTANCE IN A WIRELESS NETWORK

CROSS REFERENCE TO RELATED APPLICATION(S)

This application is a 35 U.S.C. §371 National Phase Entry Application from PCT/SE2013/050704, filed Jun. 17, 2013, designating the United States, and also claims the benefit of U.S. Provisional Application No. 61/769,041, filed Feb. 25, 2013. One or more aspects of the subject matter disclosed herein may be related to U.S. Provisional Applications 61/757,656, filed Jan. 30, 2013, and 61/753,565, filed Jan. 17, 2013. The disclosures of all of the referenced applications are incorporated herein in their entirety by reference.

TECHNICAL FIELD

The technical field of the present disclosure generally relates to wireless communication networks including methods, apparatuses, and/or systems for intelligently using control channel orders. Such orders may be utilized to cancel interferences in wireless networks.

BACKGROUND

During the past few years, wireless operators have offered mobile broadband services based on WCDMA/HSPA. Also, fuelled by new devices designed for data applications, end user performance requirements have increased. The large uptake of mobile broadband has resulted in heavy traffic volumes that need to be handled by the HSPA networks have grown significantly. Therefore, techniques that allow operators to manage their spectrum resources more efficiently are of great importance.

It is possible to improve the downlink performance by introducing support for techniques such as 4-branch MIMO, multiflow communication, multi carrier deployment, etc. Improvements in spectral efficiency per link are approaching theoretical limits. As a result, the next generation technology tends to focus on improving the spectral efficiency per unit area. Additional features for HSDPA should then provide a uniform user experience to users anywhere inside a cell by changing the topology of traditional networks. Currently 3GPP has been working on this aspect using heterogeneous networks.

A network may be homogeneous or heterogeneous. A homogeneous network is a network of base stations in a planned layout and a collection of user terminals in which all base stations have similar transmit power levels, antenna patterns, receiver noise floors, and similar backhaul connectivity to the data network. Moreover, all base stations offer unrestricted assess to user terminals in the network, and serve roughly the same number of user terminals. Examples of base stations include NodeB, eNB, eNodeB, etc. Current wireless systems that come under this category include GSM, WCDMA, HSDPA, LTE, and WiMax.

In a heterogeneous network or HetNet, in addition to the planned or regular placement of macro base stations, several pico/femto/relay base stations are deployed as illustrated in FIG. 1. The power transmitted by these pico/femto/relay base stations is relatively small compared to that of the macro base stations. For example, the transmission power from these low power nodes may be up to 2 W while the macro base stations may transmit at a power level up to 40 W. The low power nodes are typically deployed to eliminate coverage holes in the homogeneous network using macro base stations only. The low power nodes can improve capacity in hot-spots. Due to their low transmit power and small physical size, the pico/femto/relay base stations can offer flexible site acquisitions.

Heterogeneous networks can be divided into two deployment categories—co-channel deployment and combined cell. In the co-channel deployment, a low power node has a cell identifier different from that the macro node. That is, the low power nodes create different cells. But in the combined cell deployment, the low power node has a cell identifier same as that of the macro node.

FIG. 2 illustrates an example of a co-channel heterogeneous network deployment where the low power nodes create different cells. Simulations indicate that significant gains in the system throughput as well as cell edge user throughput can be realized through the co-channel deployment. One reason for the improved throughput is that the co-channel deployment provides opportunities for load balancing. In a heavy data traffic scenario, the load in the macro cell may be shared between the macro node and low power nodes. Also users with low SINR may be served by strategically located low power nodes. In short, the low power nodes can provide resources to serve users and thereby increase average user throughput of the network.

However, since each low power node creates a different cell, one disadvantage of the co-channel deployment is that a soft handover is necessary when a user equipment or UE moves from one low power node to the macro node or to another low power node. As a result, a higher layer signaling is necessary to perform the handover. In one aspect, any layer above the physical layer may qualify as the higher layer.

FIG. 3 illustrates an example of a combined cell heterogeneous network deployment. This is also referred to as soft cell or shared cell deployment, and the terms may be used interchangeably. As indicated, the low power nodes are part of the macro cell in this deployment. As such, the combined cell deployment can avoid the frequent soft handovers, and hence, can avoid the higher layer signaling.

Even though huge gains in terms of average sector throughput can be achieved with the introduction of low power nodes, the interference structure becomes more complex in heterogeneous networks. For example when a UE is connected to a low power node, individual UE link throughput may be impacted due to the interference of macro node power.

FIG. 4 illustrates an example scenario where link performance of the UE may be impacted by the macro node. The figure is applicable in both co-channel and combined cell deployments. Hence, generic term "coverage area" will be used. In the figure, two low power coverage areas served by two low power nodes within a macro coverage area are illustrated. The gray portion of the low power node coverage area is the range expansion zone. In this zone, the path loss to the macro node is higher than the path loss to the closest low power node largely due to distance differences from the zone to the nodes. But at the same time, the received power from the macro node is higher than the received power from the low power node in the range expansion zone largely due to transmit power differences among the nodes. UEs in the range expansion zone connected to the low power node may be subjected to interferences from the macro node transmissions.

FIG. 5 shows a graph of a link performance when a UE, which is connected to a low power node, experiences a strong interference from the macro node such as UEs in the range expansion zone of a low power coverage area. The interference due to other nodes is modeled as the white noise. From FIG. 5, it can be observed that there can be huge performance degradation due to the macro interference. The performance loss can be in a range of 100% at high geometries.

SUMMARY

One or more aspects of the disclosed subject matter relate to methods, apparatuses, and/or systems for intelligently using control channel orders for to perform useful operations such as interference cancellation in wireless systems.

A non-limiting aspect of the disclosed subject matter may be directed to a method performed by a network node of a wireless network to provide wireless communication services to a mobile terminal. The mobile terminal may be in a heterogeneous network setting. That is, the mobile terminal may be one of a plurality of wireless terminals located in a macro coverage area. The plurality of wireless terminals may be served by a plurality of radio nodes, in which each radio node may be structured to provide wireless services to one or more wireless terminals located within a coverage area corresponding to that radio node. The plurality of radio nodes may include a macro node whose corresponding coverage area is the macro coverage area. The plurality of radio nodes may also include one or more low power nodes with corresponding low power coverage areas. The macro coverage area may partially or wholly overlap each low power coverage area.

The method performed by the network node may include determining whether the mobile terminal will benefit from interference information related to one or more interfering signals. Each interfering signal may include data intended for a wireless terminal other than the mobile terminal. The method may also include providing, via a serving node serving the mobile terminal, the interference information to the mobile terminal when it is determined that the mobile terminal will benefit from the interference information. The serving node may be one of the radio nodes. The method may further include providing, via the serving node, a desired signal to the mobile terminal after providing the interference information. The desired signal may include data intended for the mobile terminal. The desired and the interfering signals may arrive at the mobile terminal overlapping in time at least in part.

Another non-limiting aspect of the disclosed subject matter may be directed to a computer-readable medium that includes therein programming instructions. When a computer executes the programming instructions, the computer may execute the method performed by a network node of a wireless network to provide wireless communication services to a mobile terminal as described above.

Another non-limiting aspect of the disclosed subject matter may be directed to a network node of a wireless network. The network node may be structured to provide wireless communication services to a mobile terminal. The mobile terminal may be in a heterogeneous network setting as described above. The network node may include a terminal manager, an interference manager, and a communicator. The terminal manager may be structured to determine whether the mobile terminal will benefit from interference information related to one or more interfering signals. Each interfering signal may include data intended for a wireless terminal other than the mobile terminal. The interference manager may be structured to provide, via a serving node serving the mobile terminal, the interference information to the mobile terminal when the terminal manager determines that the mobile terminal will benefit from the interference information. The serving node may be one of the radio nodes. The communicator may be structured to provide, via the serving node, a desired signal to the mobile terminal after the interference manager provides the interference information. The desired signal may include data intended for the mobile terminal. The desired and the interfering signals may arrive at the mobile terminal overlapping in time at least in part.

A non-limiting aspect of the disclosed subject matter may be directed to a method performed by a mobile terminal capable of performing interference cancellation. The mobile terminal may be in a heterogeneous network setting as described above. The method performed by the mobile terminal may include receiving interference information from a network node of a wireless network. The interference information may be related to one or more interfering signals and each interfering signal may include data intended for a wireless terminal other than the mobile terminal. The method may also include receiving a plurality of data signals from the wireless network. The data signals may include a desired signal and interfering signals. The desired signal may be received from a serving node and include data intended for the mobile terminal. The serving node may be one of the radio nodes. The method may further include canceling the interfering signals from the received data signals based on the interference information.

Another non-limiting aspect of the disclosed subject matter may be directed to a computer-readable medium that includes therein programming instructions. When a computer executes the programming instructions, the computer may execute the method performed by a mobile terminal of a wireless network to cancel interferences as described above. Another non-limiting aspect of the disclosed subject matter may be directed to a mobile terminal structured to perform interference cancellation. The mobile terminal may be in a heterogeneous network setting as described above. The mobile terminal may include an interference manager, a communicator, and an IC receiver. The interference manager may be structured to receive interference information from a network node of a wireless network. The interference information may be related to one or more interfering signals and each interfering signal may include data intended for a wireless terminal other than the mobile terminal. The communicator may be structured to receive a plurality of data signals from the wireless network. The data signals may include a desired signal and interfering signals. The desired signal may be received from a serving node and include data intended for the mobile terminal. The serving node may be one of the radio nodes. The IC receiver may be structured to cancel the interfering signals from the received data signals based on the interference information.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
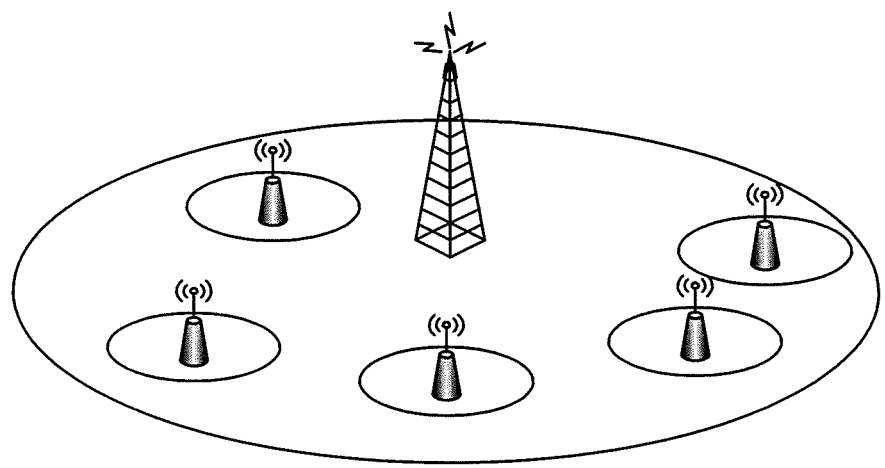
FIG. 1 illustrates a typical deployment example of low power nodes in a heterogeneous network.
Figure 2:
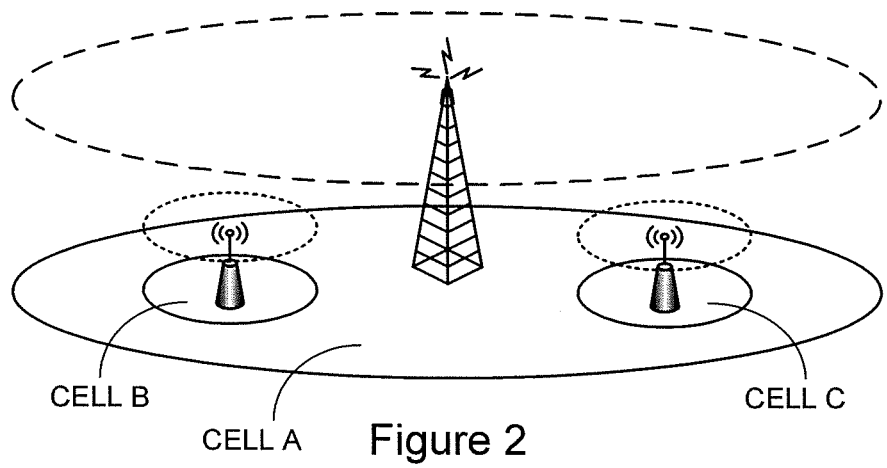
FIG. 2 illustrates an example of a co-channel heterogeneous network deployment.
Figure 3:
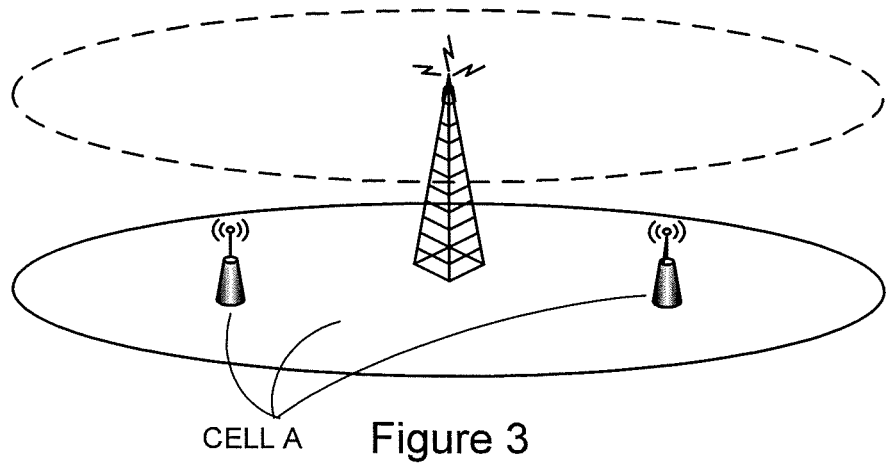
FIG. 3 illustrates an example of a combined cell heterogeneous network deployment.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor or "DSP" hardware, read only memory or "ROM" for storing software, random access memory or RAM, and non-volatile storage.

In this document, 3GPP terminologies—e.g., HSDPA, WCDMA, LTE, LTE-A—are used as examples for explanation purposes. Note that the technology described herein can be applied to non-3GPP standards, e.g., WiMAX, UMB, GSM, cdma2000, 1xEVDO, Wireless LAN, WiFi, etc. Thus, the scope of this disclosure is not limited to the set of 3GPP wireless network systems and can encompass many domains of wireless communication systems. Also, a wireless terminal will be used as an example of a receiver in which the described method can be performed. Examples of the wireless terminal include UE, laptop, PDA, smart phone, mobile terminal, etc. That is, the descriptions generally will focus on the downlink transmissions. However, the subject matter is equally applicable to uplink transmissions. That is, the disclosed subject matter is applicable to any node of the network including base stations—e.g., RBS, NodeB, eNodeB, eNB, etc.—and relay stations that receive wireless signals.

Figure 4:
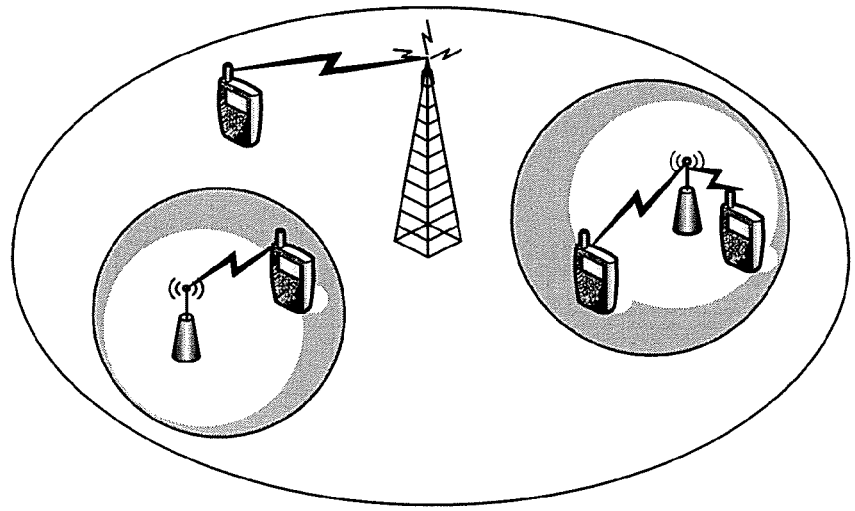
FIG. 4 illustrates an example scenario in a heterogeneous network deployment where a link performance of a user equipment may be impacted by a macro node.
Figure 5:
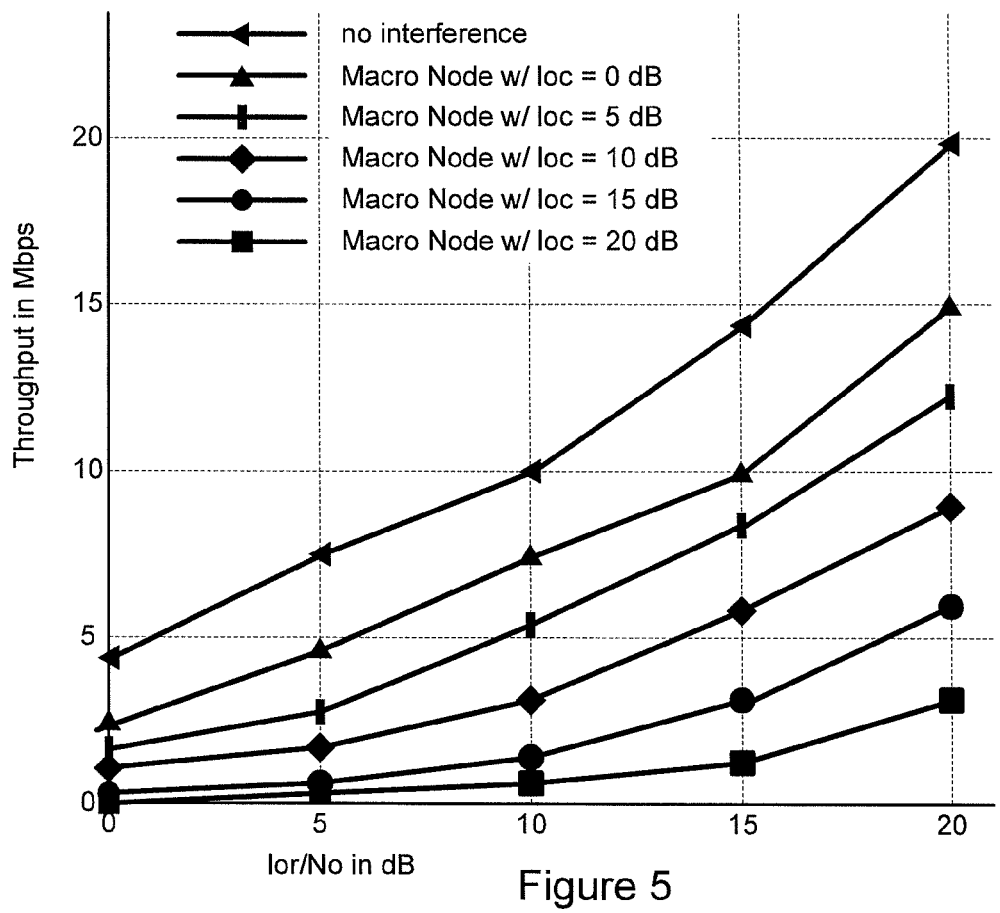
FIG. 5 is an example link performance graph illustrating performance degradation when a user equipment is in a range expansion zone of a coverage area.

As mentioned above, huge gains in throughput may be achieved with the introduction of low power nodes. However, the interference structure becomes more complex in heterogeneous networks. For example when a UE is connected to a low power node, individual UE link throughput may be impacted due to the interference of macro node power as illustrated in FIGS. 4 and 5.

To address these and other problems, one or more methods, apparatuses and/or systems are described herein in which one or more novel techniques to address interferences can be implemented. Some or all aspects of the disclosed subject matter may be applicable in a heterogeneous network comprising one or more macro nodes and one or more low power nodes.

Figure 6:
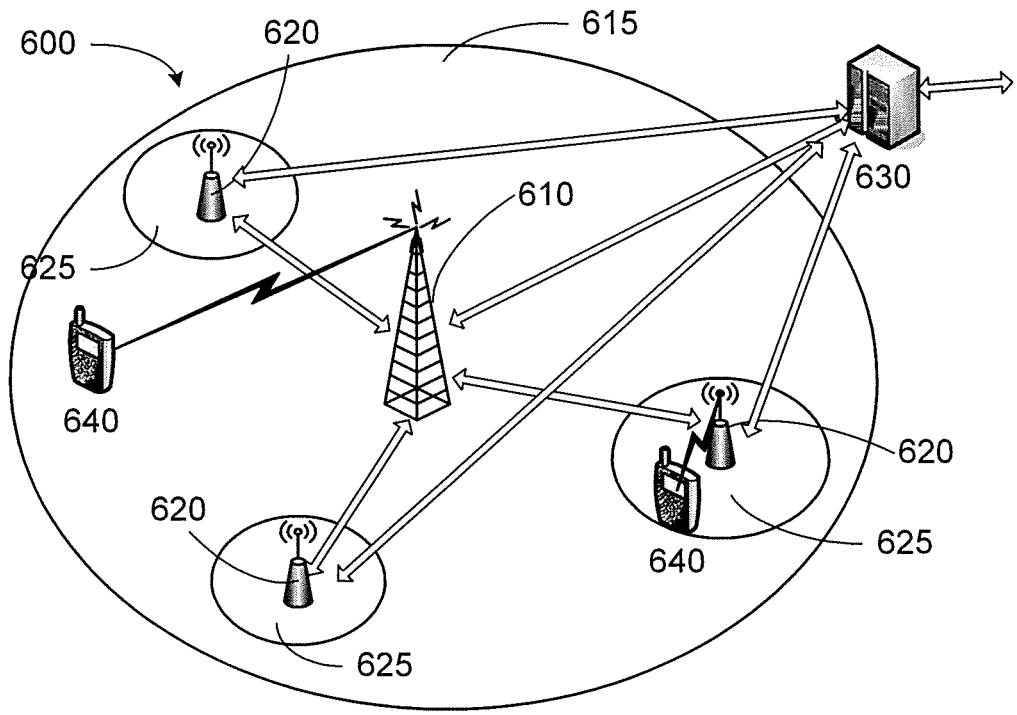
FIG. 6 illustrates an example of a heterogeneous network deployment according to an embodiment of the present invention.

FIG. 6 illustrates an example of a heterogeneous network deployment. To enable easier understanding of one or more inventive concepts, a single macro coverage area is illustrated. But it should be noted that the inventive concepts described herein can be extended in a straight forward manner to a network with multiple macro coverage areas. It should also be noted that some or all of the inventive concepts can be extended to homogeneous network, and extended also to a network with a combination of homogeneous and heterogeneous cell architectures. In general, the described concepts may be applicable to any circumstance in which a wireless terminal—e.g. a user equipment—may benefit from receiving information related to interfering signals.

As seen in FIG. 6, the network 600 may include a plurality of radio nodes arranges in a heterogeneous network architecture. Each radio node may provide wireless services to one or more wireless terminals 640 located within a coverage area corresponding to that radio node. In this example deployment, the plurality of radio nodes may include a macro node 610 with a corresponding macro coverage area 615. The plurality of radio nodes may also include one or more low power nodes 620, each with its corresponding low power coverage area 625. Each of the low power coverage areas 625 can be either wholly or partially overlapped by the macro coverage area 615.

Each radio node 610, 620 may be structured to provide wireless communication services to one or more wireless terminals 640 located within its coverage area 615, 625. In FIG. 6, two wireless terminals 640 are illustrated. Both wireless terminals 640 are within the macro coverage area 615. So both may be served as by the macro node 610. But in this particular example, one of the terminals 640 is also located within one of the low power coverage areas 625, and therefore can be served by the corresponding lower power node 620. From the perspective of a wireless terminal 640, the radio node that provides the communication service may also be referred to as the serving node. So as to minimize clutter, the range expansion zones are not illustrated in FIG. 6.

The macro coverage area 615, which may also be referred to as a macro cell, may be identifiable through a cell ID for example. In a co-channel deployment, each of the low power coverage areas 625, which may also be referred to as low power cells, may be identified through different cell IDs. For soft or combined cell deployment, the low power coverage areas 625 may have the same cell ID as that of the macro coverage area 615.

Note that the radio nodes 610, 620 may communicate with each other, which are illustrated through arrows connecting the radio nodes. The network may also include a radio network controller (RNC) 630. As seen, the radio nodes 610, 620 may communicate with the RNC 630. Communication among these network nodes may be through various means such as fiber or microwave.

Examples of macro nodes 610 include base station, Node B, eNode B, eNB, etc. Examples of low power nodes 620 include pico/femto/micro base stations and relay stations. Examples of wireless terminals 640 include smartphones, user equipments, tablets, PDAs, etc.

Figure 7:
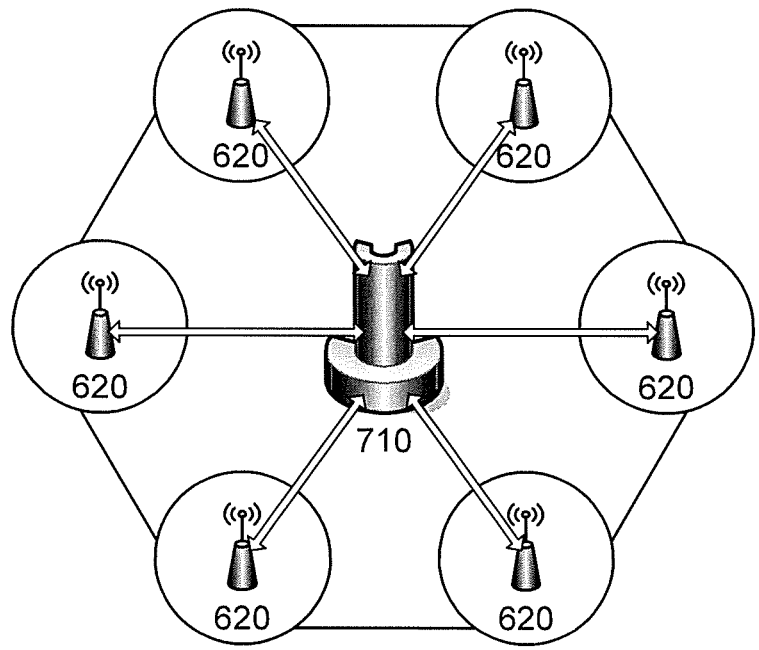
FIG. 7 illustrates an example of a central controller based heterogeneous network deployment according to an embodiment of the present invention.

In one or more aspects of the disclosed subject matter, a network node can assist the wireless terminals 640 to mitigate inferences. The network node may be any node on the network side such as the RNC 630, the macro node 610 and any other low power nodes 620. FIG. 7 illustrates an example deployment in which a central controller 710 is incorporated in the macro node 610. That is, the macro node 610 is the network node. The central controller 710 can take responsibility for collecting operational information of network environment measurements. The decision of which radio node 610, 620 will transmit to which wireless terminal 640 can be made by the central controller 710 based on the information provided by the wireless terminals 640 and/or the low power nodes 620 or on its own. The cooperation among various nodes can be instructed by the central controller 710 and implemented in a centralized way. The central controller 710 may be particular suited in a combined cell deployment.

The network node—the macro node 610, the low power node 620, or the RNC 630—may determine whether information related to interfering signals should be provided to one or more wireless terminals 640. If so, the network node may provide the interference information to the wireless terminals 640. In one embodiment, the interference information may be provided through controlled channel orders, which may be common or dedicated. Common or dedicated HS-SCCH orders are examples of such controlled channel orders. In one aspect, the interference information may be provided as network assistance via the respective serving node 610, 620.

One or more other aspects of the disclosed subject matter may be related to the wireless terminal 640. In this instance, it may be assumed that the wireless terminal 640 is capable of performing interference cancellation, i.e. is IC capable. The IC capable terminal 640 may receive the interference information of interfering signals from the network, e.g. from the network node via the serving node 610, 620. In an embodiment, the wireless terminal 640 may receive the interference information through one or more control channel orders, which may be dedicated or common. Based on the received interference information, the wireless terminal 640 may cancel interferences.

Figure 8:
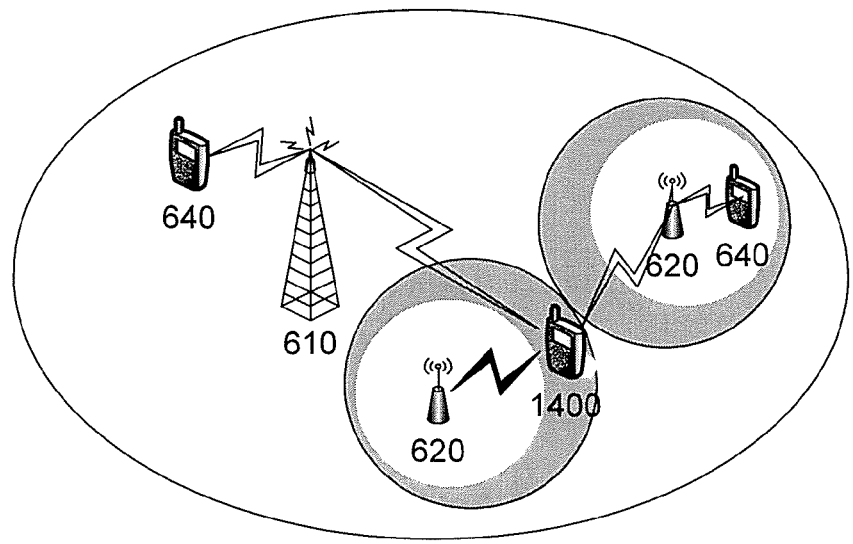
FIG. 8 illustrates an example scenario in a heterogeneous network deployment where a mobile terminal may benefit from network assistance.

To an IC capable wireless terminal 640, receiving the interference information can be very beneficial. As indicated above, the presence of low power nodes 620 implies that the interference structure becomes more complex in heterogeneous networks. This is explained with reference to FIG. 8 illustrating a scenario in which three radio nodes—macro node 610 and two low power nodes 620—are each providing wireless services to wireless terminals 640, 1400 located within respective coverage areas. Note that there is nothing particularly distinctive about the wireless terminal 1400 as compared to other wireless terminals 640. The wireless terminal 1400 is simply one of a plurality of wireless terminals located in the macro coverage area corresponding to the macro node 610. The wireless terminal 1400 is provided with a different element numbering simply to indicate that the explanation about the beneficial effect of receiving the interference information is made from the perspective of the wireless terminal 1400. To further differentiate the perspective, the wireless terminal 1400 will be referred to as "mobile" terminal 1400.

In the figure, the mobile terminal 1400 receives a desired signal—illustrated as a solid black comm-link—from one of the low power nodes 620. The desired signal in this instance may be viewed as a signal that carries data intended for the mobile terminal 1400. Note that the mobile terminal 1400 also receives a signal from the macro node 610 carrying data intended for the wireless terminal 640 on the upper left, which is illustrated as a non-filled comm-link. The mobile terminal 1400 can receive the signal intended for the second wireless terminal 640 on the upper right also illustrated as a non-filled comm-link. From the perspective of the mobile terminal 1400, these signals carrying data intended for the wireless terminals 640 other than the mobile terminal 1400 may be viewed as interfering signals. The presence of these interfering signals can cause problems at the mobile terminal 1400.

One way to address such interferences is to cancel the interfering signals from the received signals so that what is left is the desired signal. If the IC capable mobile terminal 1400 can be made aware of the interfering signal characteristics, the mobile terminal 1400 can use the knowledge to cancel the interferences. The characteristics information, i.e., information related to the interfering signals, may include among others, scheduling information (time, frequency, code of radio resources), quality of service indicators (e.g. rank, coding, modulation, etc.) and so on. The interference information may be provided as network assistance as indicated above.

Figure 9:
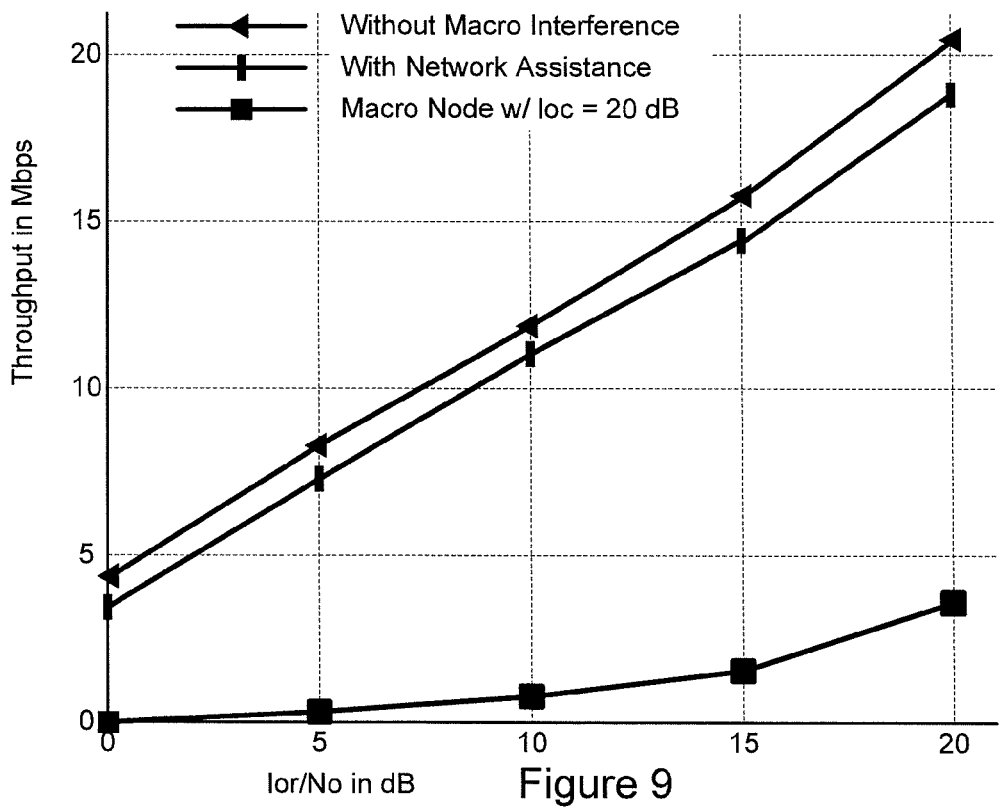
FIG. 9 is an example link performance graph illustrating performance of a user equipment with and without network assistance.

FIG. 9 illustrates an example of the link performance when the network provides network assistance information regarding the interference signals to the mobile terminal 1400. It can be observed that significant performance gains can be achieved when the IC capable terminal 1400 knows the characteristics of the interfering signals. In the simulation represented by FIG. 9, the interfering signal was reconstructed at the terminal receiver and the interference was removed after the detector output.

Figure 10:
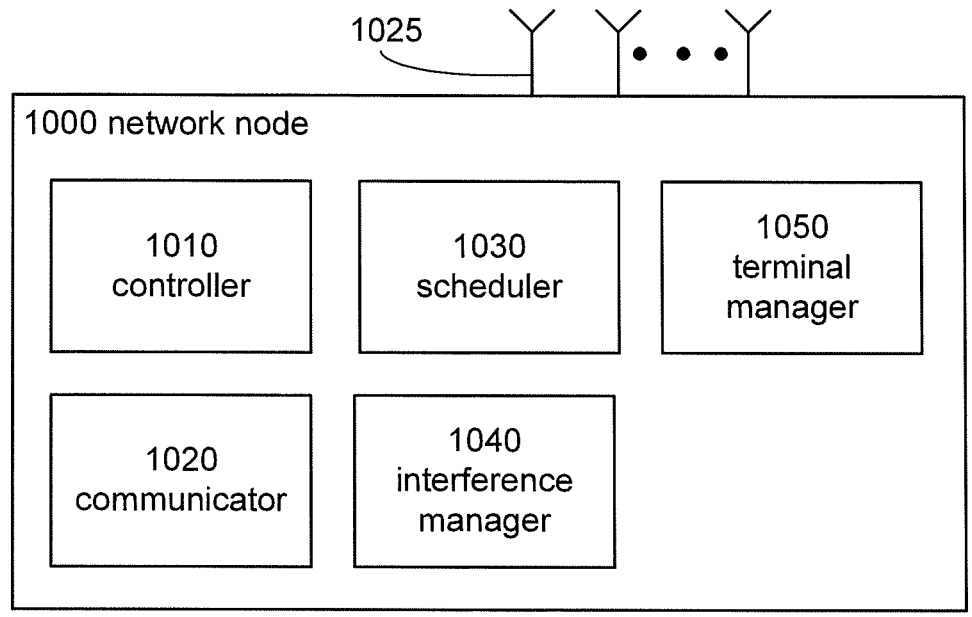
FIGS. 10 and 11 illustrate example embodiments of a network node structured to provide communication services.

FIG. 10 illustrates an example of a network node 1000 structured to provide communication serves to one or more wireless terminals 640 including the mobile terminal 1400. For example, the network node 1000 may be structured to facilitate interference cancellation at the IC capable mobile terminal 1400. The macro node 610, the low power node 620, and the RNC 630 are just some examples of the network node 1000. The network node 1000 may comprise several devices including a controller 1010, a communicator 1020, a scheduler 1030, an interference manager 1040 and a terminal manager 1050.

The communicator 1020 may be structured to communicate with other nodes of the network including base stations, RNCs and core network nodes. The communicator 1020 may also be structured to communicate with the wireless/mobile terminals 640, 1400. In one embodiment, the network node may be a radio node—macro node 610, low power node 620—and the communicator 1020 may be structured to perform radio communications with the wireless/mobile terminals 640, 1400. In another embodiment, the communicator 1020 may be structured such that the network node (e.g. RNC 630) communicates with the terminals 640, 1400 over higher layers via the serving node 610, 620. In this context, higher layer may be any layer above the physical layer such as the RLC and MAC layers.

The scheduler 1030, the interference manager 1040 and the terminal manager 1050 may be structured to work together to provide one or more control channel orders (dedicated or common) such as HS-SCCH orders to the wireless terminals 640, 1400. For example, if the terminal manager 1050 determines that the mobile terminal 1400 is IC capable, the scheduler 1030 may transmit the control channel orders. As another example, if the interference manager 1040 determines that the mobile terminal 1400 will experience or is likely to experience significant interferences (e.g., based on the location of the mobile terminal 1400), the scheduler 1030 may transmit the control channel orders. Of course, the scheduler 1030 may only transmit if the both the terminal manager 1050 and the interference manager 1040 determine that the mobile terminal 1400 is IC capable and will experience interferences.

The interference manager 1040 may also be structured to receive measurement reports from the terminals 640, 1400, and to determine their locations. The terminal manager 1050 may also be structured to determine the IC capabilities of the terminals 640, 1400 and maintain a database of the IC capabilities. The controller 1010 may be structured to control the overall operation of the network node 1000.

FIG. 10 provides a logical view of the network node 1000 and the components included therein. It is not strictly necessary that each component be implemented as a physically separate modules. Some or all components may be combined in a physical module.

Figure 11:
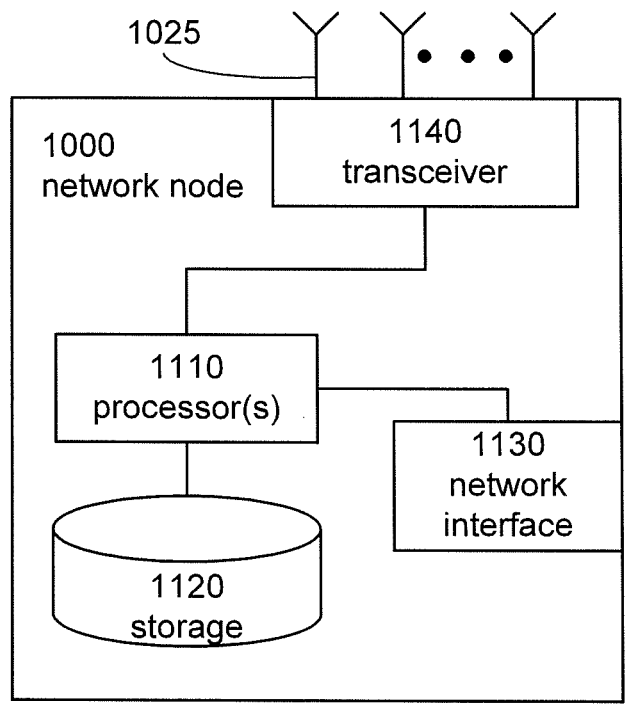

Also, the components of the network node 1000 need not be implemented strictly in hardware. It is envisioned that the components can be implemented through any combination of hardware and software. For example, as illustrated in FIG. 11, the network node 1000 may include one or more hardware processors 1110, one or more storages 1120 (internal, external, both), and one or both of a wireless interface 1140 and a network interface 1130. For example, the macro node functioning as the network node may include both the wireless interface 1140 such as a transceiver and the network interface 1130.

The processor(s) 1110 may be configured to execute program instructions to perform the functions of one or more of the network node components 1010-1050. The instructions may be stored in a non-transitory storage medium or in firmware (e.g., ROM, RAM, Flash) (denoted as storage(s) 1120). Note that the program instructions may also be received through wired and/or or wireless transitory medium via one or both of the wireless and network interfaces 1140, 1130. The wireless interface 1140 may be configured to receive wireless signals from and send wireless signals to wireless/mobile terminals 640, 1400 via one or more antennas 1025. The network interface 1130 may be included and configured to communicate with other network nodes 610, 620, 630.

Figure 12:
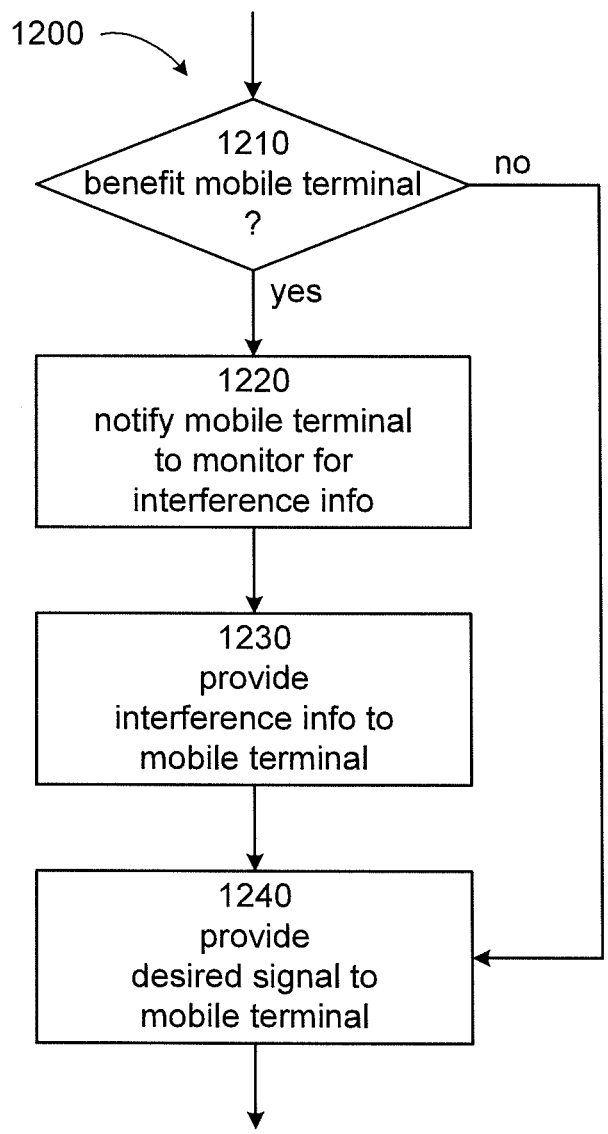
FIG. 12 is a flow chart of an example method performed by a network node to provide communication services.

FIG. 12 illustrates a flow chart of an example method performed by the network node 1000 to provide communication services to the mobile terminal 1400. For explanation purposes, the scenario illustrated in FIG. 8 may be assumed, i.e., a heterogeneous network providing services may be assumed. In the scenario, the mobile terminal 1400 can be one of a plurality of wireless terminals 640 located in the macro coverage area 615 corresponding to the macro node 610. The wireless/mobile terminals 640, 1400 may be served by a plurality of radio nodes 610, 620, in which each radio node 610, 620 is structured to provide wireless services to one or more wireless/mobile terminals 640, 1400 located within its corresponding coverage area. The plurality of radio nodes may include the macro and one or more low power nodes 610, 620. Again, each low power coverage area 625 may overlap with the macro coverage area 615 partially or wholly.

In step 1210 of the method, the terminal manager 1050 may determine whether the mobile terminal 1400 will benefit from interference information related to one or more interfering signals. Recall that from the perspective of the mobile terminal 1400, each interfering signal is a signal that comprises data intended for the wireless terminal 640 other than the mobile terminal 1400. When the terminal manager 1050 determines that the mobile terminal 1400 will benefit from the interference information, the interference manager 1040 may provide the interference information to the mobile terminal 1400 in step 1230. In one embodiment, the interference manager 1040 may provide the interference information upon the terminal manager 1050 determining that the mobile terminal 1400 will benefit. Alternatively, so as to allow the mobile terminal 1400 to prepare to receive the interference information, the communicator 1020 may notify the mobile terminal 1400 in step 1220 to monitor for the interference information prior to the interference manager 1040 providing the interference information.

In step 1240, the communicator 1020 may provide the desired signal to the mobile terminal 1400 after the interference information is provided from the interference manager 1050. Recall that the desired signal is a signal that comprises data intended for the mobile terminal 1400.

In any one or more of the steps 1220, 1230 and 1240, the notification, the interference information and/or the desired signal may be provided through the serving node 610, 620 serving the mobile terminal 1400. For example, in the scenario illustrated in FIG. 8, if the network node 1000 is either the RNC 630 (not illustrated in FIG. 8) or the macro node 610, the notification, the interference information and/or the desired signals may be provided by the low power node 620 serving the mobile terminal 1400. Thus, it can be said that the serving node 610, 620 is one of the radio nodes. In a generic sense, the interfering signals interfere with the desired signals when both arrive at the mobile terminal 1400 contemporaneously, i.e. overlapping in time at least in part.

As indicated above, it is possible that the network node 1000 and the serving node 610, 620 are different nodes. In this instance, the interference manager 1040 may cause the serving node 610, 620 to transmit the interference information to the mobile terminal 1400. On the other hand, if the network node 1000 and the serving node 610, 620 are the same, then the interference manager 1040 may transmit the interference information to the mobile terminal 1400, e.g. via the wireless interface 1140.

Figure 13:
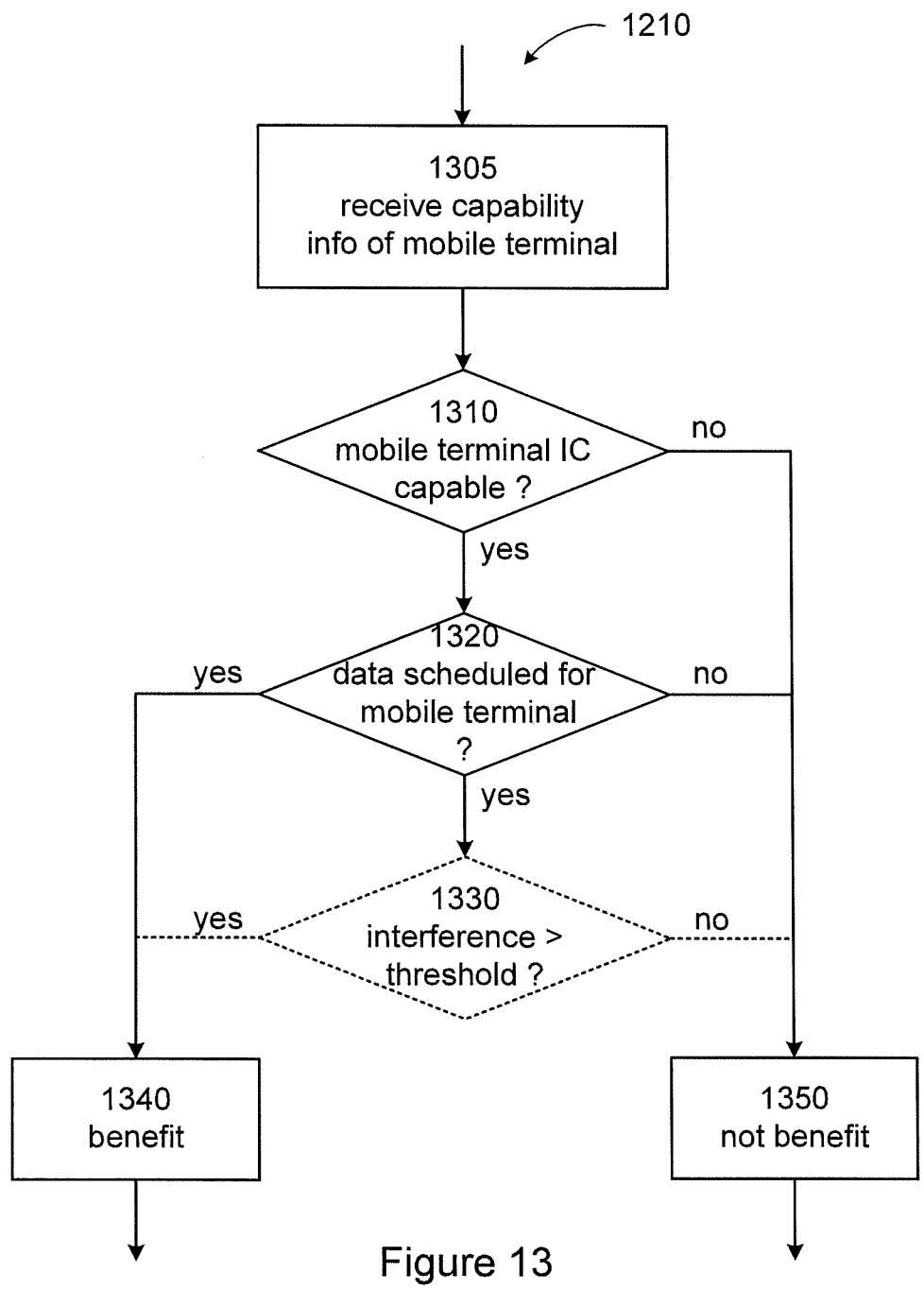
FIG. 13 is a flow chart of an example process performed by a network node to determine whether interference information would be beneficial to a mobile terminal.

FIG. 13 is a flow chart of an example implementation of step 1210, i.e. is a flow chart of an example process performed by the network node 1000 to determine whether the interference information would be beneficial to the mobile terminal 1400. In step 1310, the terminal manager 1050 may determine whether the mobile terminal 1400 is capable of performing interference cancellation. For ease of reference, this will be referred to as a first condition. If the first condition is not rue, i.e. the mobile terminal 1400 is not IC capable, then the mobile terminal 1400 would be incapable of using the interference information. As a result, the terminal manager 1050 may determine that the interference information would not benefit the mobile terminal. Note that the terminal manager 1050 may already be aware of the capabilities of the mobile terminal 1400. But in an alternative, the mobile terminal 1400 may provide its capabilities to the network node 1000, e.g. when the mobile terminal 1400 first registers with the network 600.

In step 1320, the terminal manager 1050 may determine a second condition of whether there is data scheduled for the mobile terminal 1400. If the second condition is false, i.e. there is no data for the mobile terminal 1400, then there would be no need for the mobile terminal 1400 to perform interference cancellation, and the terminal manager 1050 may determined that the interference information would not benefit.

In FIG. 13, it is indicated that step 1320 follows step 1310. However, this should not be taken in a limiting sense. It is fully contemplated that the order of steps 1310 and 1320 may be switched, or they may happen in parallel. No matter the order of performing steps 1310 and 1320, when one or both of the first and second conditions are evaluated to be false, then it can be determined that the mobile terminal 1400 will not benefit from the interference information. Conversely, in one embodiment, the terminal manager 1050 may determine that the mobile terminal 1400 will benefit when both first and second conditions are evaluated to be true.

But in another embodiment, even when both first and second conditions are true, the terminal manager 1050 may still decide that the interference information will not be of much benefit. For example, in step 1330, the terminal manager 1050 may determine a third condition of whether the mobile terminal 1400 will experience a significant interference, i.e., a level of interference greater than an interference threshold level. In this instance, the terminal manager 1050 may determine that the interference information will be a benefit when all of first, second and third conditions are true and will not benefit when any of those conditions are not true. This is in recognition that in some circumstances, a power level of the interfering signals may be so minimal that the SINR at the mobile terminal 1400 is sufficient. In such instances, the terminal 1400 may devote its processing resources to perform other useful tasks or save battery power by not performing interference cancellation.

The following are just some examples in which the third condition may be evaluated to be true:
when the mobile terminal 1400 is in a range expansion zone;
when data for at least one other wireless terminal 640 and the data for the mobile terminal 1400 are scheduled to be transmitted concurrently, e.g. within a set number of TTIs;
when the macro node 610 is scheduled to transit data to at least one other wireless terminal 640 concurrently with the data to be transmitted to the mobile terminal 1400;
when the serving node 610, 620 is scheduled to transmit data to at least one other wireless terminal 640 concurrently with the data to be transmitted to the mobile terminal 1400; and
when a number of concurrently schedules wireless terminals 640 is greater than a concurrent threshold limit.

In another embodiment, the terminal manager 1050 may determine the location of the mobile terminal 1400, and determine whether the third condition is true based on the location. The location of the mobile terminal 1400 may be determined based on the measurement reports provided by the mobile terminal 1400. For example, the mobile terminal 1400 may provide reports on strengths of pilot signals received, SINR, physical location such as GPS coordinates, and so on. Examples where the third condition based on the location may be determined to be true include range expansion zone, near an edge of the macro coverage area, in between two radio nodes where the power levels received from the radio nodes are roughly equal, and so on.

The interference information may comprise scheduling information corresponding to each interfering signal. Each scheduling information may be said to comprise information that characterizes air interface resources, i.e. radio resources, allocated to that interfering signal. Examples of such characterizing parameters include modulation and coding scheme, coding rate, transport format, transport block size, scrambling code, channelization code, resource elements scheduled for the interfering signal, category of the intended wireless terminal 640 of the interfering signal, precoding information, rank, identity of the intent wireless terminal 640, and so on.

Referring back to FIG. 12, in step 1230, the terminal manager 1050 may provide the interference information to the mobile terminal 1400 using a controlled channel order. The control channel order may be dedicated or common. A dedicated control channel order is an order specifically intended to the mobile terminal 1400, whereas a common control channel order is an order that may be intended for the mobile terminal 1400 as well as at least one other wireless terminal 640.

Figure 14:
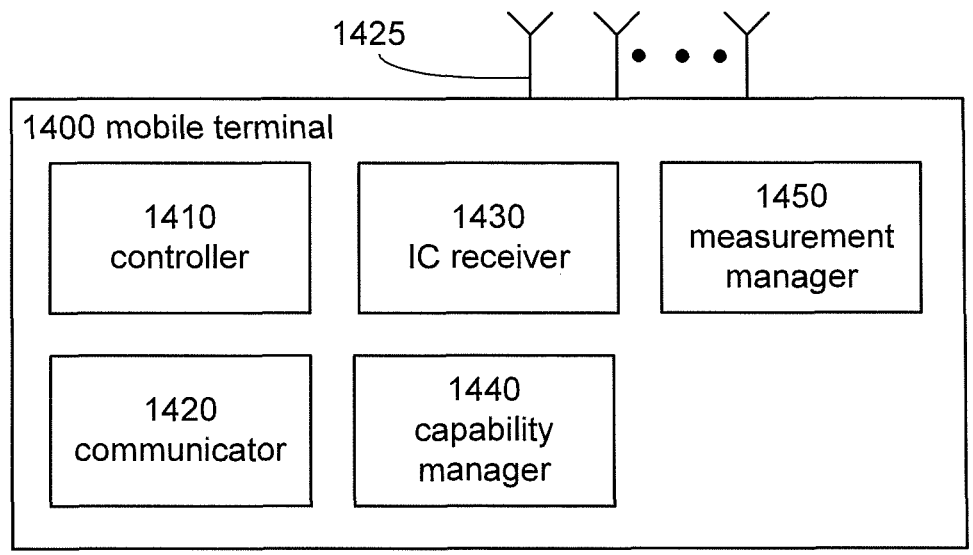
FIGS. 14 and 15 illustrate example embodiments of a mobile terminal capable of performing interference cancellation.

FIG. 14 illustrates an example of a mobile terminal 1400 capable of performing interference cancellation. The IC capable mobile terminal 1400 may include a controller 1410, a communicator 1420, an IC receiver 1430, a capability manager 1440 and a measurement manager 1450. The communicator 1420 may be structured to communicate wirelessly with other radio nodes 610, 620, 640 over one or more antennas 1425. The communicator 1420 may also be structured to perform wired communication, for example, over USB, with other nodes.

The IC receiver 1430 may be structured to receive signals (desired and interfering), receive one or more controlled channel orders, and cancel the interferences from the received signal based on the controlled channel orders. The capability manager 1440 may be structured to provide the capabilities of the mobile terminal 1400 including its IC capabilities to the network. In one embodiment, such capabilities information may be provided upon call set-up. The measurement manager 1450 may be structured to make measurements of the environment of the mobile terminal 1400 including measurements of signals transmitted from the network node 1000. The measurement manager 1450 may also be structured to provide measurement reports to the network. The controller 1410 may be structured to control the overall operation of the mobile terminal 1400.

FIG. 14 provides a logical view of the mobile terminal 1400 and the components included therein. It is not strictly necessary that each component be implemented as physically separate modules. Some or all components may be combined in a physical module.

Figure 15:
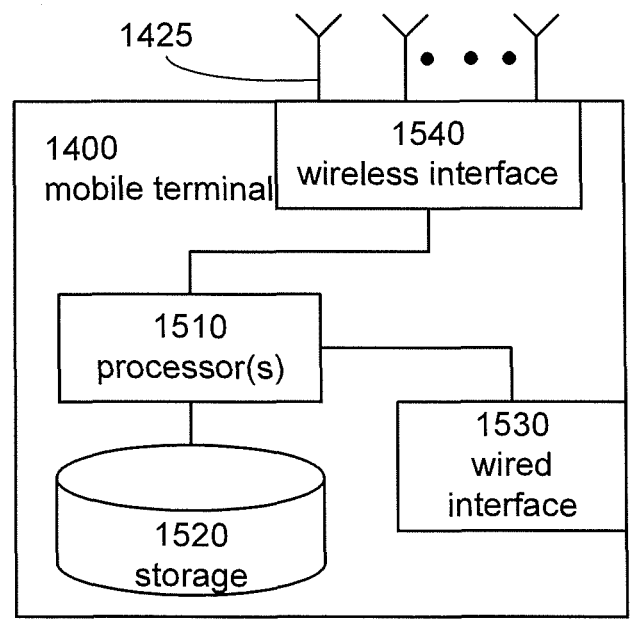

Also, the components of the mobile terminal 1400 need not be strictly implemented in hardware. It is envisioned that the components can be implemented through any combination of hardware and software. For example, as illustrated in FIG. 15, the mobile terminal 1400 may include one or more hardware processors 1510, one or more storages—internal, external, both—and one or both of a wireless interface 1540 and a wired interface 1530.

The processor(s) 1510 may be configured to execute program instructions to perform the functions of one or more of the mobile terminal components 1410-1450. The instructions may be stored in a non-transitory storage medium or in firmware (e.g., ROM, RAM, Flash) (denoted as storage(s) 1520). Note that the program instructions may also be received through wired and/or or wireless transitory medium via one or both of the wireless and network interfaces 1540, 1530. The wireless interface 1540 may be configured to receive signals from and send signals to radio nodes 610, 620 and wireless terminals 640 via one or more antennas 1425. The wired interface 1130 may be included and configured to communicate with other nodes.

Figure 16:
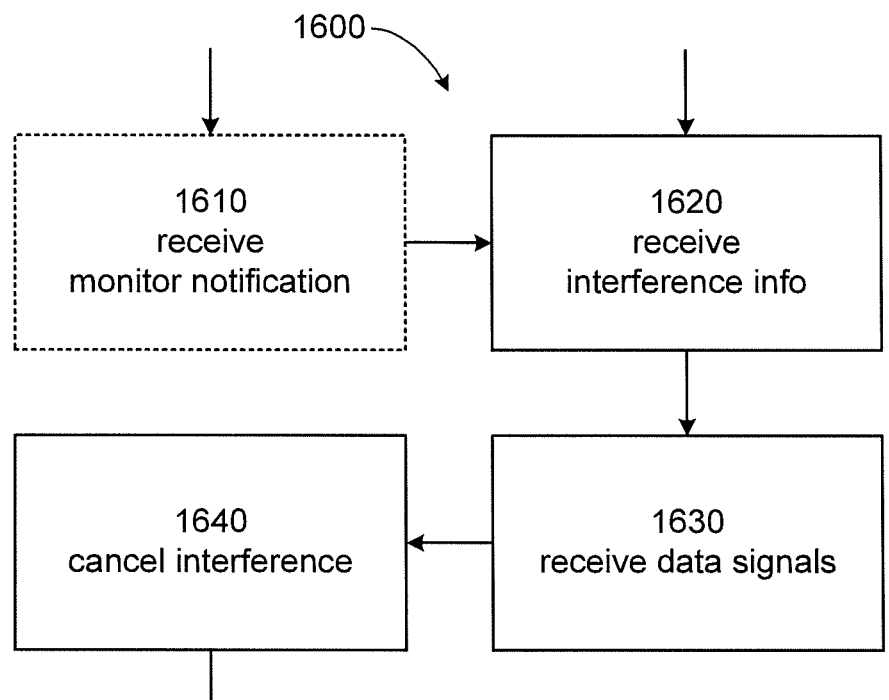
FIG. 16 is a flow chart of an example method performed by a mobile terminal to cancel interferences.

FIG. 16 illustrates a flow chart of an example method performed by the mobile terminal 1400 to cancel the interferences. Again, for simplicity of explanation, the scenario in FIG. 8 is assumed. In step 1620, the IC receiver 1430 may receive interference information from a network node. Recall that if the network node 1000 is not the same as the serving node 610, 620, the interference information will be provided through the serving node 610, 620. Also, prior to receiving the interference information from the network node 1000, the IC receiver 1430 may receive notification beforehand in step 1610.

In step 1630, the communicator may receive a plurality of data signals from the network 600. For example, the data signals may be received from the serving node 610, 620 and one or more other radio nodes 610, 620. The data signals may include by desired and interfering signals, in which the desired signal is received from the serving node 610, 620 and one or more other radio nodes 610, 620. In step 1640, the IC receiver 1430 may cancel the interfering signals from the received data signals based on the interference information.

Figure 17:
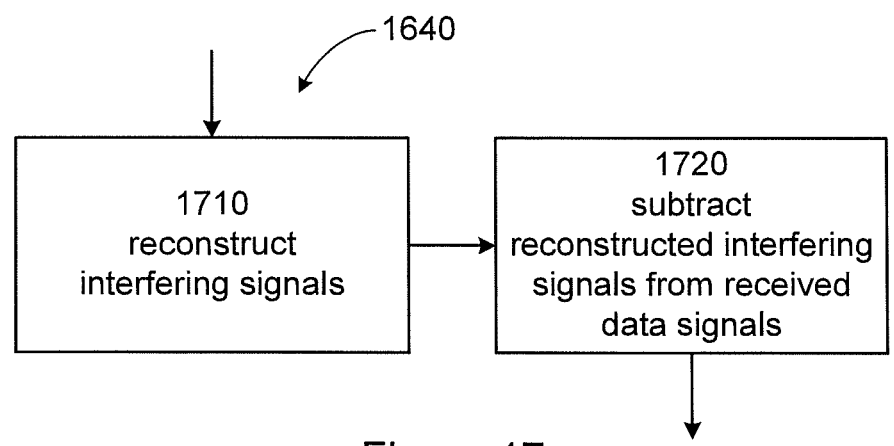
FIG. 17 is a flow chart of an example process performed by a mobile terminal to cancel interferences based on interference information.

FIG. 17 illustrates an example implementation of step 1640 to cancel the interference. In step 1710, the IC receiver 1430 may reconstruct the interfering signals based on the interference information. Then in step 1720, the IC receiver 1430 may subtract the reconstructed interfering signals from the received data signals.

In the description above and in the figures, a heterogeneous network architecture is used to describe some of the benefits of the inventive aspects of the disclosed subject matter. However, it should be noted that the disclosure is not so limiting. The disclosed subject matter may be applicable to any circumstance in which there are multiple cells and potential of interferences among wireless terminals being served by those multiple cells.

There are many advantages associated with one or more aspects of the disclosed subject matter. A non-exhaustive list of advantages include:

Efficient use of control channel orders for network assistance;

Increased throughput through more power allocation to data channels.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed by a network node of a wireless network to provide wireless communication services to a mobile terminal, the mobile terminal being one of a plurality of wireless terminals located in a macro coverage area, the plurality of wireless terminals being served by a plurality of radio nodes, each radio node being structured to provide wireless services to one or more wireless terminals located within a coverage area corresponding to that radio node, the plurality of radio nodes comprising a macro node whose corresponding coverage area is the macro coverage area and one or more low power nodes with corresponding low power coverage areas, and the macro coverage area partially or wholly overlapping each low power coverage area, the method comprising:

determining whether the mobile terminal will benefit from interference information related to one or more interfering signals, each interfering signal comprising data intended for a wireless terminal other than the mobile terminal;

providing, via a serving node serving the mobile terminal, a notification to the mobile terminal to monitor for the interference information prior to providing interference information to the mobile terminal;

providing, via the serving node serving the mobile terminal, the interference information to the mobile terminal when it is determined that the mobile terminal will benefit from the interference information; and providing, via the serving node, a desired signal to the mobile terminal after providing the interference information, the desired signal comprising data intended for the mobile terminal, wherein the serving node is one of the radio nodes, and wherein the desired and the interfering signals arrive at the mobile terminal overlapping in time at least in part.

2. The method of claim 1, wherein the step of determining whether the mobile terminal will benefit from the interference information comprises:

determining a first condition of whether the mobile terminal is IC (interference cancellation) capable;

determining a second condition of whether data is scheduled for the mobile terminal;
    determining that the mobile terminal will benefit when it is determined that both the first and second conditions are true; and
    determining that the mobile terminal will not benefit when it is determined that one or both the first and second conditions are not true.

3. The method of claim 2, wherein the step of determining whether the mobile terminal will benefit from the interference information further comprises:
    determining a third condition of whether the mobile terminal will experience a level of interference greater than an interference threshold level;
    wherein the step of determining that the mobile terminal will benefit comprises determining that the mobile terminal will benefit when it is determined that all of the first, second and third conditions are true; and
    wherein the step of determining that the mobile terminal will not benefit comprises determining that the mobile terminal will not benefit when it is determined that any one or more of the first, second and third conditions are not true.

4. The method of claim 3, wherein the step of determining the third condition comprises determining that the third condition is true when any one or more of the following are true:
    when the mobile terminal is in a range expansion zone;
    when data for at least one other wireless terminal and the data for the mobile terminal are scheduled to be transmitted concurrently;
    when the macro node is scheduled to transmit data to at least one other wireless terminal concurrently with the data to be transmitted to the mobile terminal;
    when the serving node is scheduled to transmit data to at least one other wireless terminal concurrently with the data to be transmitted to the mobile terminal; and
    when a number of concurrently scheduled wireless terminal is greater than a concurrent threshold limit.

5. The method of claim 3, wherein the step of determining the third condition comprises:
    determining a location of the mobile terminal; and
    determining whether the third condition is true based on the location of the mobile terminal.

6. The method of claim 1, wherein the interference information comprises scheduling information corresponding to each interfering signal, each scheduling information comprising information that characterizes air interface resources allocated to that interfering signal.

7. The method of claim 1 wherein the step of providing the interference information to the mobile terminal comprises providing the interference information using a control channel order.

8. A computer program product comprising a non-transitory computer-readable medium which comprises computer-executable instructions which when executed by a computer of a network node causes the computer to execute the method of claim 1.

9. A method performed by a mobile terminal capable of performing interference cancellation, the mobile terminal being one of a plurality of wireless terminals located in a macro coverage area, the plurality of wireless terminals being served by a plurality of radio nodes, each radio node being structured to provide wireless services to one or more wireless terminals located within a coverage area corresponding to that radio node, the plurality of radio nodes comprising a macro node whose corresponding coverage area is the macro coverage area and one or more low power nodes with corresponding low power coverage areas, and the macro coverage area partially or wholly overlapping each low power coverage area, the method comprising:
    interference information from a network node of a wireless network, the interference information being related to one or more interfering signals, each interfering signal comprising data intended for a wireless terminal other than the mobile terminal;
    receiving a notification to monitor for interference information prior to receiving the interference information;
    receiving a plurality of data signals from the wireless network, the data signals comprising a desired signal and the interfering signals, the desired signal being received from a serving node and comprising data intended for the mobile terminal; and
    canceling the interfering signals from the received data signals based on the interference information, wherein the step of canceling the interfering signals from the received data signals comprises:
    reconstructing the interfering signals based on the interference information; and
    subtracting the reconstructed interfering signals from the received data signals;
    wherein the serving node is one of the radio nodes.

10. The method of claim 9, wherein the interference information comprises scheduling information corresponding to each interfering signal, each scheduling information comprising information relating to air interface resources allocated to that interfering signal.

11. The method of claim 9, wherein the step of receiving the interference information comprises receiving the interference information as a control channel order.

12. A computer program product comprising a non-transitory computer-readable medium which comprises computer-executable instructions which when executed by a computer of a mobile terminal causes the computer to execute the method of claim 9.

13. A network node of a wireless network, the network node configured to provide wireless communication services to a mobile terminal, the mobile terminal being one of a plurality of wireless terminals located in a macro coverage area, the plurality of wireless terminals being served by a plurality of radio nodes, each radio node configured to provide wireless services to one or more wireless terminals located within a coverage area corresponding to that radio node, the plurality of radio nodes comprising a macro node whose corresponding coverage area is the macro coverage area and one or more low power nodes with corresponding low power coverage areas, and the macro coverage area partially or wholly overlapping each low power coverage area, the network node comprising:
    a terminal manager configured to determine whether the mobile terminal will benefit from interference information related to one or more interfering signals, each interfering signal comprising data intended for a wireless terminal other than the mobile terminal;
    a communicator configured to provide a notification to the mobile terminal to monitor for the interference information prior to providing interference information to the mobile terminal;
    an interference manager configured to provide, via a serving node serving the mobile terminal, the interference information to the mobile terminal when the terminal manager determines that the mobile terminal will benefit from the interference information; and the communicator further configured to provide, via the serving node, a desired signal to the mobile terminal after the interference manager provides the interference information, the desired signal comprising data intended for the mobile terminal, wherein the serving node is one of the radio nodes, and wherein the desired and the interfering signals arrive at the mobile terminal overlapping in time at least in part.

14. The network node of claim 13, wherein in order to determine whether the mobile terminal will benefit from interference information, the terminal manager is configured to:

determine a first condition of whether the mobile terminal is IC (interference cancellation) capable;

determine a second condition of whether data is scheduled for the mobile terminal;

determine that the mobile terminal will benefit when it is determined that both the first and second conditions are true; and determine that the mobile terminal will not benefit when it is determined that one or both the first and second conditions are not true.

15. The network node of claim 14, wherein in order to determine whether the mobile terminal will benefit from interference information, the terminal manager is further configured to:

determine a third condition of whether the mobile terminal will experience a level of interference greater than an interference threshold level;

determine that the mobile terminal will benefit when it is determined that all of the first, second and third conditions are true; and determine that the mobile terminal will not benefit when it is determined that any one or more of the first, second and third conditions are not true.

16. The network node of claim 15, wherein the terminal manager is configured to determine that the third condition is true when any one or more of the following are true:

when the mobile terminal is in a range expansion zone;

when data for at least one other wireless terminal and the data for the mobile terminal are scheduled to be transmitted concurrently;

when the macro node is scheduled to transmit data to at least one other wireless terminal concurrently with the data to be transmitted to the mobile terminal;

when the serving node is scheduled to transmit data to at least one other wireless terminal concurrently with the data to be transmitted to the mobile terminal; and when a number of concurrently scheduled wireless terminal is greater than a concurrent threshold limit.

17. The network node of claim 15, wherein in order to determine whether the third condition is true, the terminal manager is configured to:

determine a location of the mobile terminal; and determine whether the third condition is true based on the location of the mobile terminal.

18. The network node of claim 13, wherein the interference information comprises scheduling information corresponding to each interfering signal, each scheduling information comprising information relating to air interface resources allocated to that interfering signal.

19. The network node of claim 13, wherein in order to provide the interference information to the mobile terminal, the interference manager is configured to provide the interference information using a control channel order.

20. A mobile terminal configured to perform interference cancellation, the mobile terminal being one of a plurality of wireless terminals located in a macro coverage area, the plurality of wireless terminals being served by a plurality of radio nodes, each radio node configured to provide wireless services to one or more wireless terminals located within a coverage area corresponding to that radio node, the plurality of radio nodes comprising a macro node whose corresponding coverage area is the macro coverage area and one or more low power nodes with corresponding low power coverage areas, and the macro coverage area partially or wholly overlapping each low power coverage area, the mobile terminal comprising:

an interference manager structured to receive interference information from a network node of a wireless network, the interference information being related to one or more interfering signals, each interfering signal comprising data intended for a wireless terminal other than the mobile terminal;

a communicator configured to receive a notification to monitor for interference information prior to receiving the interference information;

the communicator further configured to receive a plurality of data signals from the wireless network, the data signals comprising a desired signal and the interfering signals, the desired signal comprising data intended for the mobile terminal; and an IC receiver configured to cancel the interfering signals from the received data signals based on the interference information, wherein the IC receiver is further configured to:

reconstruct the interfering signals based on the interference information; and subtract the reconstructed interfering signals from the received data signals;

wherein the serving node is one of the radio nodes.

21. The mobile terminal of claim 20, wherein the interference information comprises scheduling information corresponding to each interfering signal, each scheduling information comprising information relating to air interface resources allocated to that interfering signal.

22. The mobile terminal of claim 20, wherein the interference manager is configured to receive the interference information as a control channel order.

* * * * *